United States Patent [19]
Yellin

[11] 3,903,642
[45] Sept. 9, 1975

[54] TERRARIUM AND STAND THEREFOR

[76] Inventor: Bernard Yellin, 5252 S. Kolmar Ave., Chicago, Ill. 60632

[22] Filed: Nov. 2, 1973

[21] Appl. No.: 412,172

[52] U.S. Cl. .................. 47/34; 47/39; 206/45.34; 248/159; D35/3 R; D35/3 C
[51] Int. Cl.² ................. A01G 9/02; A47G 7/02; B65D 25/54; F16M 11/00
[58] Field of Search ............. 47/34, 34.1, 39, 35, 17, 47/28, 29, 30, 26; D35/3 R, 3 A, 3 B, 3 C; 29/28; 206/423, 45.34; 248/146, 150, 152, 159

[56] References Cited
UNITED STATES PATENTS

| 85,253 | 9/1931 | Matsuno | 119/5 X |
|---|---|---|---|
| 119,982 | 4/1940 | Munz | D35/3 A |
| 196,165 | 10/1877 | Pardessus | 47/29 |
| 229,766 | 1/1974 | Kephart | 119/5 X |
| 265,098 | 9/1882 | Johnston | 47/34 |
| 1,017,217 | 2/1912 | Jones | 47/34.1 |
| 2,950,567 | 8/1960 | Newman | 47/34.1 X |
| 3,269,578 | 8/1966 | Lewis | 206/45.34 |
| 3,315,409 | 4/1967 | Poulin | 47/17 |
| 3,650,384 | 3/1972 | Pegg | 206/45.34 |
| 3,748,783 | 7/1973 | Sokolies | 47/34 X |

FOREIGN PATENTS OR APPLICATIONS

| 1,206,304 | 9/1970 | United Kingdom | 248/159 |
|---|---|---|---|
| 1,306,137 | 9/1962 | France | 47/29 |

*Primary Examiner*—Edgar S. Burr
*Assistant Examiner*—Steven A. Bratlie
*Attorney, Agent, or Firm*—Max R. Kraus

[57] ABSTRACT

A terrarium comprising a globe-shaped hollow member formed of a pair of generally semi-spherical sections which have abutting rim edges to retain the two sections to form the globe shape and where the globe member is supported on a stand formed of a pair of generally similar shaped sections secured together, all of said components being capable of being packaged and shipped in a knock-down condition and readily assembled. An additional feature is that the upper semi-spherical section has an opening closed by adjustable shutter means which serves to control the humidity of the terrarium.

4 Claims, 5 Drawing Figures

PATENTED SEP 9 1975 3,903,642
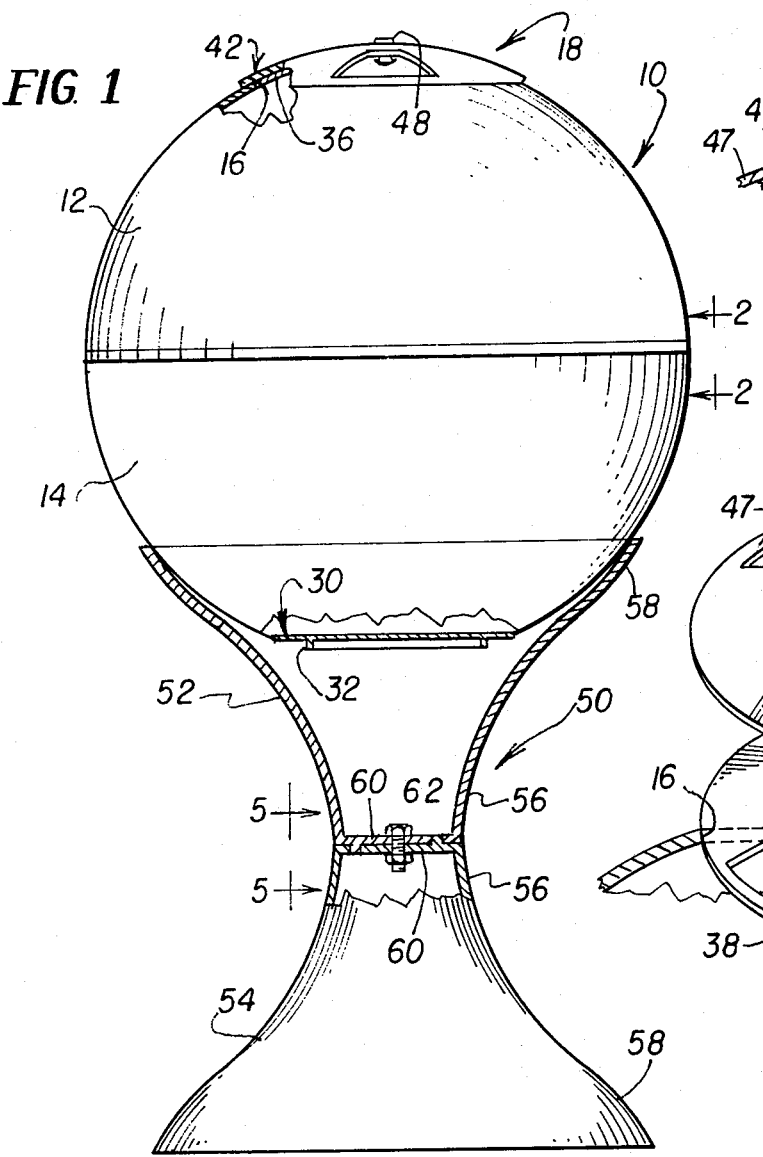
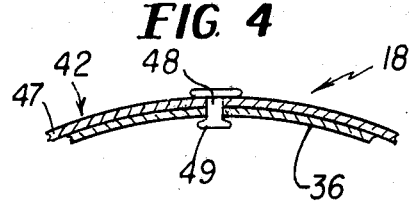
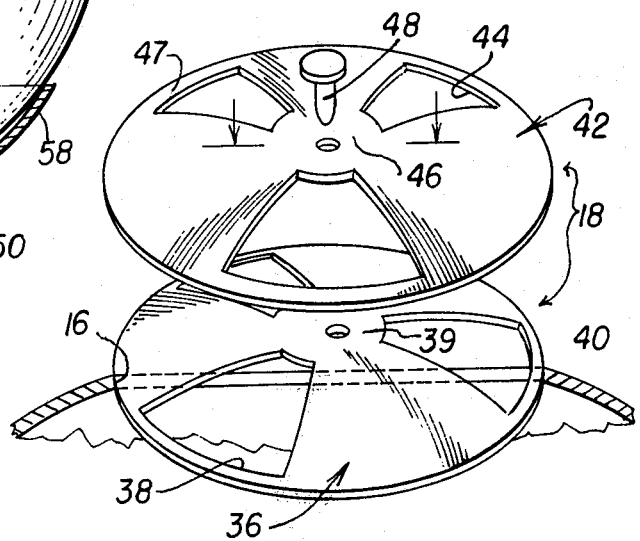
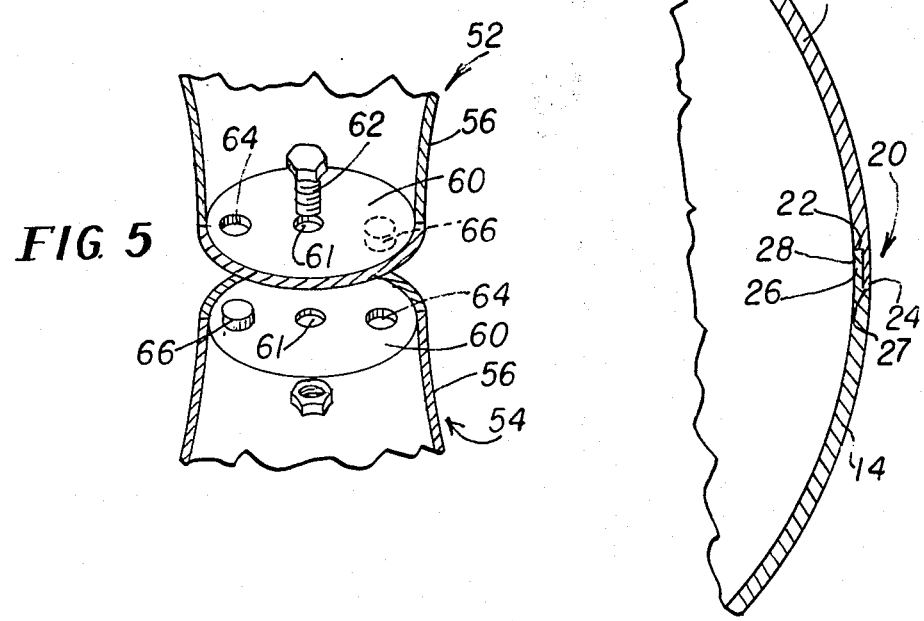

TERRARIUM AND STAND THEREFOR

BRIEF SUMMARY OF THE INVENTION

This invention is directed to a terrarium comprising a generally hollow transparent globular shaped member formed of a pair of semi-spherical shaped sections each with interfitting rims to interlock the spherical sections together and with a supporting stand formed of a pair of identical shaped sections readily secured to each other. Said components are so constructed that they may be economically molded of a plastic material and packaged and shipped in a knock-down disassembled condition and readily assembled by the consumer, resulting in a considerable decrease in cost.

Another object of this invention is to provide an opening in the upper semi-spherical section which is closed by an adjustable shutter to control the humidity in the globular shaped member, as by controlling the rate of evaporation of the water from the globular member as well as the ambient air admitted into the globular member.

Another object of this invention is to provide a structure in which the two semi-spherical members can be formed from a single mold and in which the two sections forming the base or support may likewise be formed from a single mold, thereby reducing to a minimum the number of molds for producing the terrarium.

BRIEF DESCRIPTION OF THE DRAWINGS

In the drawings:

FIG. 1 is an elevational view partly in section of this invention.

FIG. 2 is a sectional view taken on line 2—2 of FIG. 1.

FIG. 3 is an exploded perspective view of the members forming the shutter.

FIG. 4 is a sectional view of the shutter in assembled position; and

FIG. 5 is an exploded view partly in section taken on line 5—5 of FIG. 1 before the two stand sections are connected.

The terrarium is formed of a hollow globe-like member generally indicated at 10 which is formed of two generally similar semi-spherical or bowl shaped sections indicated at 12 and 14. The section 12 forms the upper half of the globe and the section 14 forms the lower half of the globe. The upper section 12 is provided with a central annular opening 16 which is adapted to be covered by shutter means generally indicated at 18.

The annular bottom edge or rim 20 of the upper section 12 has a stepped portion providing an inwardly facing annular shoulder 22 with an annular depending lip 24. The lower bowl section 14 has an annular upper edge or rim 26 with an outwardly facing annular shoulder 27 and an upwardly extending lip 28. The two bowl sections 12 and 14 are retained in interfitting engagement, best seen in FIG. 2, by positioning the rim portion 20 of the upper section 12 on the rim portion 26 of the lower section 14. The two bowl sections 12 and 14 preferably are not permanently secured together but are readily connected by the interfitting engagement described. The central portion of the lower section 14 is closed by a planar annular wall portion 30 having a depending annular lip 32 formed integrally with the lower section 14.

The two bowl sections 12 and 14 are molded of a clear transparent plastic material so that the entire globe-like member 10 is transparent. Since the upper and lower sections 12 and 14 are for the most part of identical shape they may be formed separately in the same mold cavity and when the upper section 12 is molded the mold cavity is provided with the means whereby the central opening 16 is formed in said upper section, whereas when the lower section 14 is molded in the same mold cavity an insert is provided in the mold cavity so that the planar wall 30 and an annular lip 32 are formed as an integral part of the lower bowl section 14. Inserts are also provided in said mold cavity for forming the respective rims 20 and 26. The flat or planar wall 30 and the annular lip 32 at the bottom of the lower section 14 also serves to permit the terrarium to rest on a flat table or other support should it be desired to so support the terrarium and eliminate the stand. The transparent globe-like member 10 has a diameter of approximately twenty inches.

The shutter member generally indicated at 18 comprises a generally concave-convex shaped stationary bottom member 36 having a plurality of spaced segmental openings 38 which define an annular central portion 39 and an annular rim 40, all integrally formed and molded of a transparent plastic material. Superimposed on said bottom stationary member 36 is a top rotatable member 42 of generally concave-convex configuration having a plurality of similar shaped openings 44 and a central annular portion 46 and a peripheral annular rim 47 also molded of a transparent material. The central portions 39 and 46 of said members are each provided with a central opening which receives a pin 48 which when compressed, as seen in FIG. 4, forms a shoulder 49 at its lower end to interlock the two members together but permits relative rotation of the top rotatable shutter member 42 with respect to the bottom stationary member 36. The rim portion or peripheral edge 47 of the top rotatable member 42 extends outwardly beyond the peripheral edge of the bottom stationary member 36 and when the shutter is positioned on the upper section 12 to close the central opening 16 thereof, as seen in FIG. 1, the outer edge of the bottom stationary member 36 will abut against the annular wall of the opening 16, with the top rotatable member 42 overlapping the edge of the upper bowl section adjacent the opening 16 so that the shutter is supported on said upper bowl with the top rotatable member 42 of the shutter rotatable with respect to the upper bowl and with respect to the bottom stationary member 36 of the shutter. By rotating the rotatable member of the shutter with respect to the stationary member the size or dimension of the respective openings 38 and 44 can be regulated and/or controlled and can be increased to the maximum opening by alining the pairs of openings together, and by rotating one with respect to the other to decrease the open areas therebetween. Likewise the openings 38 and 44 may be completely closed by rotating the upper shutter member with respect to the lower shutter member. The shutter 18 may be readily removed in its entirety thus exposing the interior of the globe-like member 10.

The stand on which the globe-like member is supported is generally designed at 50 and is formed of two identical sections 52 and 54 which can be molded in the same mold cavity. The sections are hollow and have a generally bell-shaped configuration comprising a reduced annular stem portion 56 which flares outwardly to form the skirt or bell-shaped portion 58 of said section. The stem portion 56 of each of said sections is closed by a horizontal wall 60 and said end wall is provided with a central opening 61 whereby the two sections 52 and 54 are connected by suitable fastening means 62. Additionally, each of said end walls 60 is provided with an opening 64 and a boss 66 so that when the sections are inverted with respect to each other for the purpose of connecting same the boss 66 of one end wall will interfit in the opening 64 in the other to aline the two sections together and by securing them together by the fastening means 62 the two sections are locked against relative rotation with respect to each other. As is clear, either section 52 or 54 may be used as the means for supporting the semi-spherical bowl shaped member with the other section then forming the portion which rests on the ground.

The lower portion of the terrarium is positioned to seat within the hollow portion of the stand section, as best seen in FIG. 1, and rests therein and thereon and no fastening means are required to secure the bowl shaped section 10 to said stand 50. The terrarium and stand can be formed with a minimum number of mold cavities.

By providing the shutter 18, the air and moisture or humidity in the terrarium can be controlled or regulated. Soil is placed in the bottom section 14 of the terrarium and is planted with small plants or flowers and the soil is watered. By regulating the openings 38 and 47 in the shutter the humidity in the globe is controlled to meet the necessary or particular requirements. If there is too much moisture it will condense on the inside surface of the globe and cloud it and this can be remedied by increasing the openings in the shutter to allow the moisture to pass through the openings to the atmosphere and allow more air to enter the globe. The shutter may also be closed to prolong the rate of evaporation of moisture in the globe.

What is claimed is:

1. A terrarium formed of components that may be packaged and shipped in a knock-down disassembled condition and readily assembled by the user, said components including a pair of separately formed semi-spherical shaped members comprising an upper semi-spherical shaped member and a lower semi-spherical shaped member, each said semi-spherical shaped member molded of plastic material in the same first mold cavity, each having interfitting rims whereby the two semi-spherical shaped members are positioned and joined one above the other to form a single hollow globular bowl-shaped member, with said interfitting rims extending within the exterior surfaces of said semi-spherical shaped members so that the two semi-spherical shaped members when joined form a continuous exterior surface at their juncture which does not extend outwardly of said surface, said upper member having a central opening at the top thereof, said lower semi-spherical shaped member having a horizontal planar wall at the bottom thereof, said components including a stand for supporting said single hollow globular bowl-shaped member, said stand formed of a pair of identical but separately formed bell-shaped hollow sections each molded of plastic material in the same second mold cavity and each having an outer annular edge at one end with a cross wall at the opposite end, one of said bell-shaped sections being above and inverted with respect to the other, said bell-shaped sections being secured together at said cross walls, by fastening means, the lower walls of said lower spherical-shaped member seated within the upper one of said bell-shaped hollow sections without being fastened thereto, with the globular wall surface engaging the wall surface of said upper bell-shaped section immediately adjacent the outer annular edge thereof, with said horizontal planar wall positioned within said upper bell-shaped section and below the annular outer edge of said upper bell-shaped section.

2. A terrarium as set forth in claim 1 in which the semi-spherical shaped members are transparent.

3. A terrarium as set forth in claim 1 in which the central opening is closed by an adjustable shutter which comprises a stationary concavo-convex shaped member and a manually rotatable superposed concavo-convex shaped member, each of said members having openings which may be controlled by rotating the rotatable member with respect to the stationary member.

4. A terrarium as set forth in claim 1 in which each of the cross walls is provided with an opening and a boss so that when the bell-shaped sections are inverted with respect to each other for connecting them the boss of each will interfit in the opening of the other to aline the sections together.

* * * * *